US010673727B2

(12) United States Patent
Mizrahi

(10) Patent No.: US 10,673,727 B2
(45) Date of Patent: Jun. 2, 2020

(54) TIME-MULTIPLEXED FIELDS FOR NETWORK TELEMETRY

(71) Applicant: Marvell Israel (M.I.S.L) Ltd., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 164 days.

(21) Appl. No.: 15/602,562

(22) Filed: May 23, 2017

(65) Prior Publication Data

US 2017/0346714 A1 Nov. 30, 2017

Related U.S. Application Data

(60) Provisional application No. 62/340,674, filed on May 24, 2016.

(51) Int. Cl.
*H04L 12/26* (2006.01)

(52) U.S. Cl.
CPC .......... *H04L 43/12* (2013.01); *H04L 43/0805* (2013.01); *H04L 43/0829* (2013.01); *H04L 43/0835* (2013.01); *H04L 43/0858* (2013.01); *H04L 43/0864* (2013.01); *H04L 43/0894* (2013.01); *H04L 43/106* (2013.01)

(58) Field of Classification Search
CPC ............. H04L 43/0805; H04L 43/0829; H04L 43/0835; H04L 43/0858; H04L 43/0864; H04L 43/0894; H04L 43/106; H04L 43/12

See application file for complete search history.

(56) References Cited

U.S. PATENT DOCUMENTS

| 8,098,648 | B2 * | 1/2012 | Nakata | .................... H04L 12/56 370/254 |
|---|---|---|---|---|
| 8,547,855 | B1 | 10/2013 | Zingale et al. | |
| 8,830,841 | B1 * | 9/2014 | Mizrahi | .................. H04L 43/10 370/241.1 |
| 2003/0115321 | A1 | 6/2003 | Edmison et al. | |
| 2003/0214913 | A1 | 11/2003 | Kan et al. | |
| 2004/0095926 | A1 * | 5/2004 | Bennett | ............... H04L 43/0858 370/384 |

(Continued)

OTHER PUBLICATIONS

Abdul, et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).

(Continued)

*Primary Examiner* — Asad M Nawaz
*Assistant Examiner* — Kai Chang

(57) ABSTRACT

A first network device forwards a plurality of packets to the one or more network ports for transmission to a second network device, wherein ones of the packets include a field for indicating different, independent types of information. A field populator is configured to, for each of at least some packets among the plurality of packets: determine, from a set of different, independent types of information, a type of information to be included in the field of the packet according to a schedule known by the second network device, and populate the field in the packet only with data according to the type of information determined according to the schedule.

23 Claims, 7 Drawing Sheets

(56) References Cited

U.S. PATENT DOCUMENTS

| | | | |
|---|---|---|---|
| 2004/0098479 A1* | 5/2004 | Bennett | H04L 43/0852 709/224 |
| 2008/0031146 A1* | 2/2008 | Kwak | H04L 41/5003 370/250 |
| 2009/0190482 A1* | 7/2009 | Blair | H04L 43/0858 370/250 |
| 2010/0296474 A1 | 11/2010 | Noriega | |
| 2011/0099224 A1 | 4/2011 | Samuels et al. | |
| 2012/0033563 A1* | 2/2012 | Jazra | H04L 47/2433 370/252 |
| 2013/0250796 A1* | 9/2013 | Frankkila | H04L 47/28 370/252 |
| 2014/0022928 A1 | 1/2014 | Zingale et al. | |
| 2014/0341032 A1* | 11/2014 | Thaler | H04L 47/2433 370/235 |
| 2015/0181459 A1* | 6/2015 | Zhu | H04L 65/1033 370/236 |

OTHER PUBLICATIONS

Capello et al., "A Packet Based Method for Passive Performance Monitoring," The Internet Engineering Task Force (IETF®), Internet-Draft, version 3, pp. 1-24 (Mar. 21, 2016).

Chen et al., "IP Flow Performance Measurement Framework," The Internet Engineering Task Force (IETF®), Internet-Draft, version 6, pp. 1-17 (Mar. 17, 2016).

Chin et al., "IEEE 1588 Clock Synchronization using Dual Slave Clocks in a Slave," IEEE Communications Letters, vol. 13, No. 6, pp. 456-458 (Jun. 2009).

IEEE P1588™ D2.2 "Draft Standard for a Precision Clock Synchronization Protocol for Networked Measurement and Control Systems," The Institute of Electrical and Electronics Engineers, Inc., 2008.

IEEE Std. 1588™—2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

IEEE Std. C37.238™—2011, "IEEE Standard Profile for Use of IEEE 1588™ Precision Time Protocol in Power System Applications," *Institute for Electrical and Electronics Engineers, Inc.*, pp. 1-66 (Jul. 2011).

ITU-T Recommendation G.8265.1/Y.1365.1, "Precision time protocol telecom profile for frequency synchronization," *Int'l Telecommunication Union*, pp. 1-28 (Oct. 2010).

IEC 62439-3, "Industrial communication networks—High availability automation networks—Part 3: Parallel Redundancy Protocol (PRP) and High-availability Seamless Redundancy (HSR)," *International Electrotechnical Commission*, pp. 1-62 (2010).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills et al., "Network Time Protocol Version 4: Protocol and Algorithms Specification," Request for Comments: 5905, *Internet Engineering Task Force (IETF)*, pp. 1-111 (Jun. 2010).

Mills, "Internet Time Synchronization: the Network Time Protocol," Network Working Group Request for Comments, No. 1129, pp. 1-29 (Oct. 1989).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).

Shpiner et al., "Multi-Path Time Synchronization," Internet Engineering Task Force (IETF), pp. 1-15 (Oct. 15, 2012).

Weber et al., "High availability seamless automation ring (Draft IEC 62439-3) and IEEE 1588 time sync dependencies," *Institute for Electrical and Electronics Engineers, Inc*, pp. 1-7 (Oct. 2010).

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).

International Search Report and Written Opinion in International Patent Application No. PCT/IB17/53021, dated Oct. 2, 2017 (22 pages).

* cited by examiner

TIME-MULTIPLEXED FIELDS FOR NETWORK TELEMETRY

CROSS REFERENCES TO RELATED APPLICATIONS

This application claims the benefit of U.S. Provisional Patent App. No. 62/340,674, entitled "Method for Network Telemetry Using Time-Multiplexed Fields," filed on May 24, 2016, the disclosure of which is hereby expressly incorporated herein by reference in its entirety.

FIELD OF TECHNOLOGY

The present disclosure relates generally to communication systems, and more particularly to measuring network performance in a communication system.

BACKGROUND

In a communication network, it is often useful to measure performance metrics such as packet delay and packet loss between two network devices. Such metrics are useful for detection of faults and anomalies in the communication network.

One technique, referred to as "passive performance monitoring," involves marking data packets in a way that enables measuring packet loss and/or packet delay, thereby eliminating the need for sending additional measurement packets. In particular, a flow of packets is partitioned into different consecutive blocks by marking each packet in a block with a "color," so that all packets in a block have the same color and consecutive blocks have different colors. Packets are marked by adding a bit to headers of the packet that indicates the "color" of the packet. A sender node records the numbers of packets in each block. A receiver node identifies blocks of packets using the color indicator in the headers of the packets, and counts the number of received packets in each block. By comparing the number of packets in a block recorded by the sender node with the number of packets in the block received by the receiver node, a loss measurement is calculated.

To measure delay, the sender node records a time at which a packet is transmitted (transmit time), and the receiver nodes records a time at which the packet is received (receipt time). By comparing the transmit time with the receipt time, a delay measurement is calculated. To reduce computational load, the transmit time and the receipt time for only one packet in each block are recoded. In order to indicate to the receiver node the one packet in the block for which the receiver node is to record a receipt time, the sender node includes a further header field in the packets. This further header field indicates (or "marks") the packets for which the sender node recorded transmit times.

The sender node sends i) the recorded number of packets in each block and ii) the recorded transmit time of the one packet in each block to a measurement node. Similarly, the receiver node sends i) the recorded number of received packets in each block and ii) the recorded receipt time of the one packet in each block to the measurement node. The measurement node then calculates a loss measurement metric using the recorded number of packets in each block from the sender node and the recorded number of received packets in each block from the receiver node. Similarly, the measurement node calculates a delay measurement metric using the recorded transmit time of the marked packet in each block from the sender node and the recorded receipt time of the marked packet in each block from the receiver node.

SUMMARY

In an embodiment, a first network device comprises: one or more network ports configured to couple to one or more network links; and a packet processor coupled to the one or more network ports, the packet processor configured to forward a plurality of packets to the one or more network ports for transmission to a second network device, wherein ones of the packets provided by the packet processor include a field for indicating different, independent types of information. The first network device also comprises a field populator configured to, for each of at least some packets among the plurality of packets: determine, from a set of different, independent types of information, a type of information to be included in the field of the packet according to a schedule known by the second network device, and populate the field in the packet only with data according to the type of information determined according to the schedule.

In another embodiment, a method includes: determining, at a first network device, a type of information to include in a field of a packet according to a schedule known by the second network device, the type of information determined from a set of different, independent types of information; populating, at the first network device, the field in the packet only with data according to the type of information determined according to the schedule; and transmitting, with the first network device, the packet to the second network device.

In yet another embodiment, a first network device comprises: one or more network ports configured to couple to one or more network links; and a packet processor coupled to the one or more network ports, the packet processor configured to process a plurality of packets received from a second network device via the one or more network ports, wherein at least some packets received from the second network device includes a field for indicating different types of information. The first network device also comprises a field interpreter configured to, for each of at least some packets among the plurality of packets: determine, from a set of different, independent types of information, a type of information that is included in the field of the packet according to a schedule used by the second network device to populate fields in the plurality of packets, and interpret data in the field in the packet according to the type of information determined according to the schedule used by the second network device to populate fields in the plurality of packets.

In still another embodiment, a method comprises: receiving, at a first network device, a packet from a second network device; determining, at the first network device and from a set of different, independent types of information, a type of information included in a field of the packet according to a schedule a schedule used by the second network device to populate fields in a plurality of packets transmitted by the second network device to the first network device; and interpreting, at the first communication device, data in the field in the packet according to the type of information determined according to the schedule used by the second network device to populate fields in the plurality of packets.

DETAILED DESCRIPTION

In embodiments described below, a type of information in a field within packets is time-multiplexed according to a schedule known to both a sender device and a receiver device in a communication network. In an illustrative embodiment, the field includes a "color" indicator for some packets, whereas for other packets the single field includes a marker indicating whether the receiver device should record times at which the packets are received (receipt time). By time-multiplexing the type of information included in the field, multiple different, independent types of information can be conveyed across the network in a single field of a packet without requiring multiple fields in each packet for the different, independent types of information, thus reducing overhead.

Figure 1:
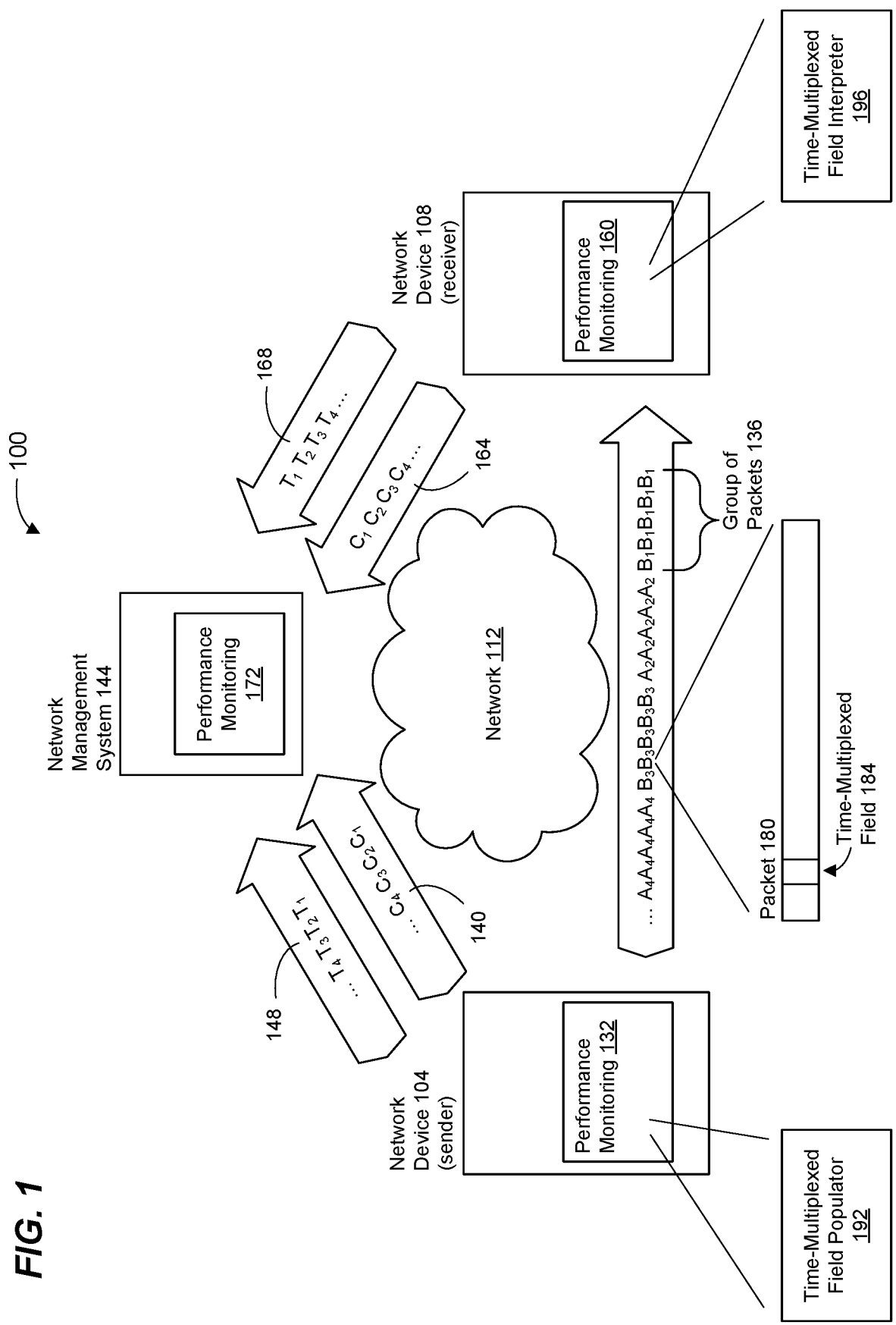
FIG. 1 is a block diagram of an example system in which packets having time-multiplexed fields are utilized for network performance measurement, according to an embodiment.

FIG. 1 is a block diagram of an example system 100 that employs network telemetry, according to an embodiment. The system 100 includes a first network device 104 (sender 104), and a second network device 108 (receiver 108) communicatively coupled via a communication network 112. The sender 104 is, or is a component of, an endpoint device such as a network testing device, a computer, a server, a smart appliance, etc., according to some embodiments. In other embodiments, the sender 104 is, or is a component of, network infrastructure device such as a bridge, a router, etc. Similarly, the receiver 108 is, or is a component of, an endpoint device such as a network testing device, computer, a server, a smart appliance, etc., according to some embodiments; or the receiver 108 is, or is a component of, network infrastructure device such as a bridge, a router, etc., according to other embodiments.

The communication network 112 includes one of, or any suitable combination of two or more of, a wired network, a wireless network, a satellite network, a wide area network (WAN), a metropolitan area network (MAN), a local area network (LAN), a wireless LAN (WLAN), etc.

The sender 104 and the receiver 108 include respective network interface devices configured to transmit and receive packets via the communication network 112.

The sender 104 includes a performance monitoring unit 132 that is configured to mark data packets, transmitted by the sender 104 to the receiver 108, to enable measuring network performance metrics such as packet loss, packet delay, etc., in an embodiment. For example, the performance monitoring unit 132 is configured to mark packets within a block of consecutive packets with a "color," so that all packets in the block have the same color and consecutive blocks have different colors. In an embodiment, packets are marked by adding a field to the packet (e.g., within a header of the packet or another suitable location within the packet) that indicates the "color" of the packet. In FIG. 1, two "colors" of packets are illustrated: A and B; and groups of packets are indicated by packets having a same subscript. For instance, four groups of packets (subscripts 1-4) are illustrated in FIG. 1, in which a group 136 of packets has the color B.

In embodiments functionally corresponding to two "colors" of packets, for example, a single bit field is indicates the color of the packet, e.g., a first color (e.g., color A) corresponds to the single bit set to zero, and a second color (e.g., color B) corresponds to the single bit set to one.

The performance monitoring unit 132 is configured to record the number of packets in each group of packets having the same color. In FIG. 1, recorded counts 140 of packets are denoted as C, with a subscript that indicates the group of packets to which the count C corresponds. For example, count $C_1$ corresponds to the group 136 of packets ($B_1B_1B_1B_1B_1$); count $C_2$ corresponds to the group of packets ($A_2A_2A_2A_2A_2$); etc.

The performance monitoring unit 132 is configured to send the recorded counts 140 of packets to a network management system 144. In an embodiment, the recorded counts 140 of packets are sent to the network management system 144 via the communication network 112. In another embodiment, the recorded counts 140 of packets are sent to the network management system 144 via another communication network (not shown) different than the communication network 112.

The performance monitoring unit 132 is also configured to record a time of transmission (transmit time) of a packet in each group of packets with the same color. In FIG. 1, the recorded transmit times 148 of packets are denoted as T, with a subscript that indicates the group of packets to which the transmit time T corresponds. For example, time $T_1$ corresponds to a transmit time of a packet within the group 136 of packets ($B_1B_1B_1B_1B_1$); time $T_2$ corresponds to a transmit time of a packet within the group of packets ($A_2A_2A_2A_2A_2$); etc.

The performance monitoring unit 132 is configured to send the recorded transmit times 148 of packets to the network management system 144. In an embodiment, the recorded transmit times 148 of packets are sent to the network management system 144 via the communication network 112. In another embodiment, the recorded transmit times 148 of packets are sent to the network management system 144 via another communication network (not shown) different than the communication network 112.

The receiver 108 includes a performance monitoring unit 160 that is configured to count packets, record times of receipt of packets, etc., to enable measuring network performance metrics such as packet loss, packet delay, etc. For example, the performance monitoring unit 160 is configured to identify a block of packets from the sender 104 with a same "color," count a number of packets in the block, and record the count. In an embodiment, the performance monitoring unit 160 is configured to identify a block of packets of the same color by examining the field (discussed above) added to the packets by the sender 104, and to record counts 164 in each identified block of packets.

The performance monitoring unit 160 is configured to send the recorded counts 164 of packets to the network management system 144. In an embodiment, the recorded counts 164 of packets are sent to the network management system 144 via the communication network 112. In another embodiment, the recorded counts 164 of packets are sent to the network management system 144 via another communication network (not shown) different than the communication network 112.

The performance monitoring unit 160 is also configured to record a time of reception (receipt time) of a packet, within each group of packets, for which the sender recorded a transmit time. The performance monitoring unit 160 is configured to send recorded receipt times 168 of packets to the network management system 144. In an embodiment, the recorded receipt times 168 of packets are sent to the network management system 144 via the communication network 112. In another embodiment, the recorded receipt times 168 of packets are sent to the network management system 144 via another communication network (not shown) different than the communication network 112.

A performance monitoring unit 172 in the network management system 144 receives the recorded counts 140 from the sender 104 and the recorded counts 164 from the receiver 108, and calculates a packet loss metric using at least some of the recorded counts 140 and at least some of the recorded counts 164. For example, in an embodiment, the performance monitoring unit 172 calculates a difference, for each of multiple groups of packets, between the count recorded by the sender 104 and the count recorded by the receiver 108, and then averages the differences over multiple groups of packets to generate a packet loss metric.

The performance monitoring unit 172 in the network management system 144 also receives the recorded transmit times 148 from the sender 104 and the recorded receipt times 168 from the receiver 108, and calculates a packet delay metric using at least some of the recorded transmit times 148 and at least some of the recorded receipt times 168. For example, in an embodiment, the performance monitoring unit 172 calculates a delay for each of multiple packets (e.g., based on a difference between a transmit time recorded by the sender 104 and a receipt time recorded by the receiver 108), and then averages the respective delays of multiple packets to generate a packet delay metric.

An example packet 180 transmitted by the sender 104 to the receiver 108 includes a time-multiplexed field 184 (e.g., within a header of the packet or another suitable location within the packet, such as at a designated location within a payload of the packet or a trailer of the packet). A type of information within the field 184 is time-multiplexed, across multiple packets, according to a schedule known to both the sender 104 and the receiver 108. The types of information within the field 184 are selected from a set of different, independent types of information, according to an embodiment. For example, each type of information is independent of other types of information among the set of different types of information, according to an embodiment.

In some embodiments, the different, independent types of information relate to network performance measurement. In an illustrative embodiment, the field 184 includes a "color" indicator for some packets and the field 184 does not indicate whether the receiver 108 should record times at which the packets are received (receipt time), whereas for other packets the field 184 includes a marker indicating whether the receiver 108 should record times at which the packets are received (receipt time). Thus, when the field 184 is populated with a first type of information among the set of different types of information, the field does not convey any information regarding a second type of information among the set of different types of information; and when the field 184 is populated with the second type of information, the field does not convey any information regarding the first type of information, according to an embodiment.

In one embodiment, the field 184 consists of a single bit. In another embodiment, the field 184 comprises multiple bits.

The performance monitoring unit 132 of the sender 104 includes a time-multiplexed field populator 192 that is configured to populate the time-multiplexed field 184 with different types of information according to the schedule. In an illustrative embodiment, time-multiplexed field populator 192 is configured to populate the field 184 with a color indicator for some packets, and for other packets to populate the field 184 with a marker indicating whether the receiver 108 should record receipt times for the packets.

The performance monitoring unit 160 of the receiver 108 includes a time-multiplexed field interpreter 196 that is configured to interpret contents of the time-multiplexed field 184 as different types of information according to the schedule. In an illustrative embodiment, time-multiplexed field interpreter 196 is configured to interpret information in the field 184 as a color indicator for some packets, and for other packets to interpret information in the field 184 as indicating whether the receiver 108 should record receipt times for the packets.

Figure 2A:
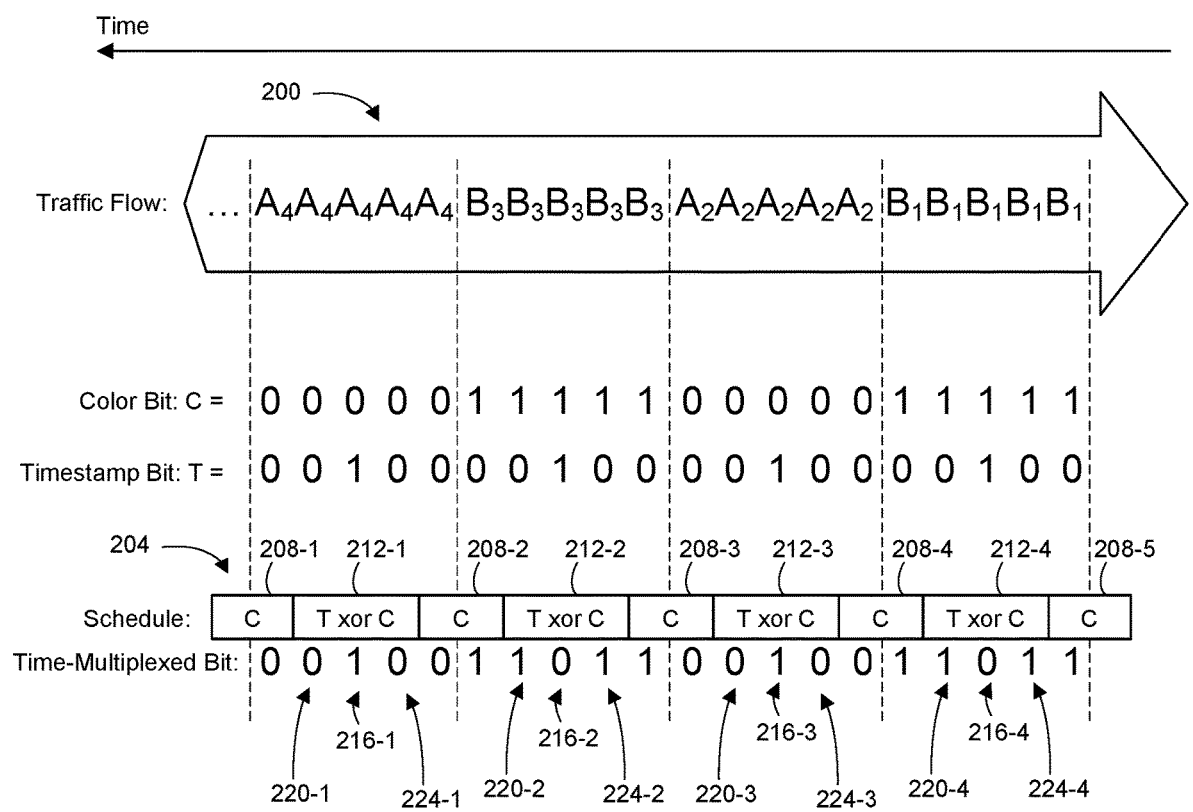
FIG. 2A is a timing diagram illustrating a scheduled for a time-multiplexed field in packets exchanged via a network, according to an embodiment.

FIG. 2A is a timing diagram illustrating an example of populating the time-multiplexed field 184 according to a schedule known to the sender 104 and the receiver 108, according to an embodiment. In the example of FIG. 2A, the time-multiplexed field 184 consists of a single bit. In other embodiments in which the time-multiplexed field 184 comprises multiple bits, similar techniques are utilized.

A packet flow 200 includes blocks of consecutive packets with a same color (e.g., A or B), so that all packets in the block have the same color and consecutive blocks have different colors. A color bit C corresponds to the color of the packet (e.g., for color A, color bit C=0, and for color B, color bit C=1). A timestamp bit T corresponds to whether the receiver 108 is to record a receipt time for the packet (e.g., if T=0, then it is not necessary for the receiver 108 to record the receipt time; whereas if T=1, then the receiver 108 should record the receipt time). In an embodiment, the color of the packets in the flow 200 changes according to a defined time period known to the sender 104 and to the receiver 108. In another embodiment, the color of the packets in the flow changes according to a defined number of packets known to the sender 104 and to the receiver 108, i.e., each block of packets having the same color includes the defined number of packets.

A schedule 204 is known to both the sender 104 and the receiver 108. The schedule 204 indicates that, for some time periods 208, the time-multiplexed field 184 is populated with a color indicator, e.g., the color bit C. The schedule 204 also indicates that, for some time periods 212, the time-multiplexed field 184 is populated with a value that corresponds to the color bit C exclusive-OR'ed (XORed) with the timestamp bit T. Thus, for example, the time-multiplexed bit 216 indicates that the sender 104 recorded the transmit time for the packet that includes the time-multiplexed bit 216, and thus the receiver 108 is to record the receipt time of the packet that includes the time-multiplexed bit 216. On the other hand, the time-multiplexed bits 220 and 224 indicate the color of the packets that include the time-multiplexed bits 220 and 224.

Figure 2B:
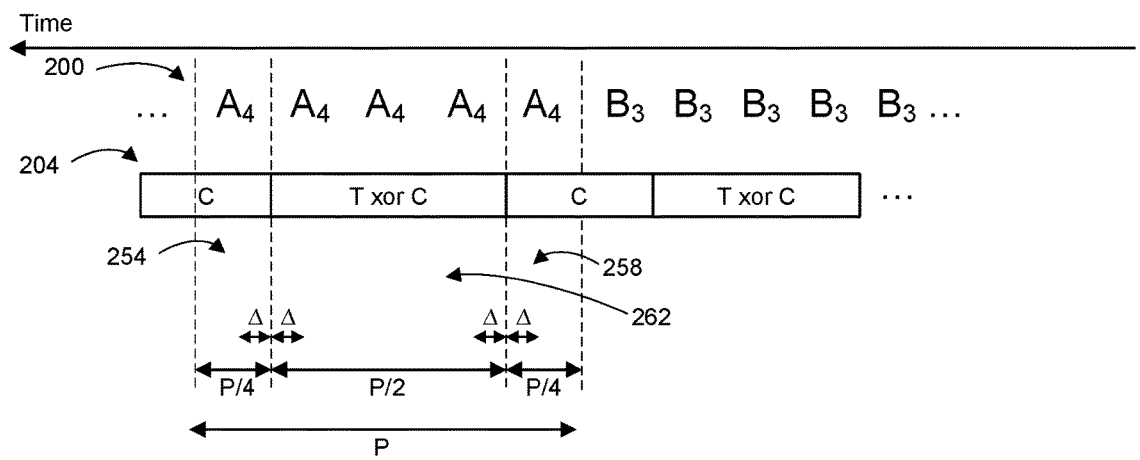
FIG. 2B is another view of a portion of the timing diagram of FIG. 2A, according to an embodiment.

FIG. 2B is another view of a portion of the timing diagram of FIG. 2A. A block period P of the schedule 204 corresponds to a length of a block of packets having the same color. The block period P is defined by a time duration, according to one embodiment. The block period P is defined by a number of packets, according to another embodiment.

The block period P is partitioned into multiple segments. For example, in an embodiment, the block period P includes a first edge segment 254, a second edge segment 258, and a middle segment 262. In an embodiment, the first edge segment 254 has a duration corresponding to P/4, the second edge segment 258 has a duration corresponding to P/4, and the middle segment 262 has a duration corresponding to P/2. The edge segment 254 and the edge segment 258 generally correspond to time periods when the time-multiplexed field 184 is set to the color bit C, whereas the middle segment 262 generally corresponds to a time period in which the time-multiplexed field 184 is set to the color bit C XORed with the timestamp bit T.

The schedule 204 includes a guard band ±Δ at the transition from the edge segment 254 to the middle segment 262, and at the transition from the middle segment 262 to the edge segment 258. During the guard bands, the color of packets is not permitted to change, according to an embodiment. Also during the guard bands, a packet is not permitted to be marked as requiring the receiver 108 to record the receipt time, according to an embodiment. In an embodiment, Δ is set to δ+(D−d), where δ is a maximum time difference between a local clock used by the sender 104 and a local clock used by the receiver 108, D is a maximum packet delay between the sender 104 and the receiver 108, and d is a minimum packet delay between the sender 104 and the receiver 108. In an embodiment, P/4>Δ.

Referring now to FIGS. 1 and 2B, the time-multiplexed field interpreter 196 is configured to interpret, during edge segment 254 and during the edge segment 258 (except for during the guard bands), the time-multiplexed field 184 as being set to the color bit C, according to an embodiment. Additionally, the time-multiplexed field interpreter 196 is configured to, during middle segment 262 (except for during the guard bands), interpret the time-multiplexed field 184 as being set to the color bit C XORed with the timestamp bit T, according to an embodiment. Further, the time-multiplexed field interpreter 196 is configured to, during the guard bands, ignore the value of time-multiplexed field 184, according to an embodiment. The time-multiplexed field interpreter 196 is configured to, during the guard bands, assume that the color of the packets has not changed, according to an embodiment. In another embodiment, the time-multiplexed field interpreter 196 is configured to, during the guard bands, attempt to determine a type of information included in the time-multiplexed field 184.

Because the color of packets is not permitted to change during the guard bands and because a packet is not permitted to be marked as requiring the receiver 108 to record the receipt time during the guard bands, the value of C and the value of C XORed with T is the same during the guard bands, according to an embodiment. Thus, if the time-multiplexed field interpreter 196 interprets the field 184 during the guard band as a color bit, the time-multiplexed field interpreter 196 will interpret the color correctly; and if the time-multiplexed field interpreter 196 interprets the field 184 during the guard band as being set to the color bit C XORed with the timestamp bit T, the time-multiplexed field interpreter 196 will not flag the packet as needing a receipt time recordation, according to an embodiment.

Figure 3A:
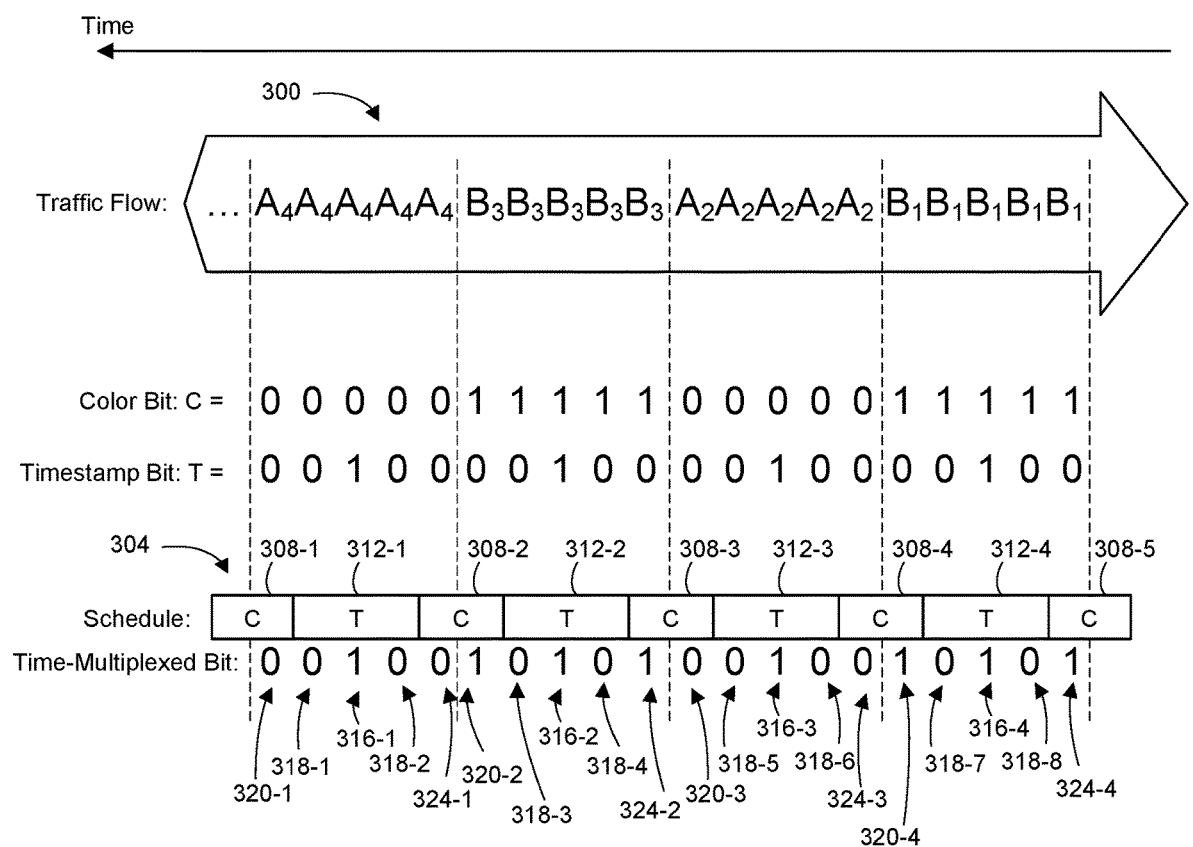
FIG. 3A is a timing diagram illustrating a scheduled for a time-multiplexed field in packets exchanged via a network, according to another embodiment.

FIG. 3A is a timing diagram illustrating another example of populating the time-multiplexed field 184 according to a schedule known to the sender 104 and the receiver 108, according to another embodiment. In the example of FIG. 3A, the time-multiplexed field 184 consists of a single bit. In other embodiments in which the time-multiplexed field 184 comprises multiple bits, similar techniques are utilized.

A packet flow 300 includes blocks of consecutive packets with a same color (e.g., A or B), so that all packets in the block have the same color and consecutive blocks have different colors. A color bit C corresponds to the color of the packet, and a timestamp bit T corresponds to whether the receiver 108 is to record a receipt time for the packet (e.g., if T=0, then it is not necessary for the receiver 108 to record the receipt time; whereas if T=1, then the receiver 108 is to record the receipt time). In an embodiment, the color of the packets in the flow 300 changes according to a defined time period known to the sender 104 and to the receiver 108. In another embodiment, the color of the packets in the flow 300 changes according to a defined number of packets known to the sender 104 and to the receiver 108, i.e., each block of packets having the same color includes the defined number of packets.

A schedule 304 is known to both the sender 104 and the receiver 108. The schedule 304 indicates that, for some time periods 308, the time-multiplexed field 184 is populated with a color indicator, e.g., the color bit C. The schedule 304 also indicates that, for some time periods 312, the time-multiplexed field 184 is populated with a value that corresponds to the timestamp bit T. Thus, for example, the time-multiplexed bit 316 indicates that the sender 104 recorded the transmit time for the packet that includes the time-multiplexed bit 316, and thus the receiver 108 is to record the receipt time of the packet that includes the time-multiplexed bit 316. The time-multiplexed bits 318 indicate the receiver 108 is not required to record the receipt times of the packets that include the time-multiplexed bit 318. On the other hand, the time-multiplexed bits 320 and 324 indicate the color of the packets that include the time-multiplexed bits 320 and 324.

Figure 3B:
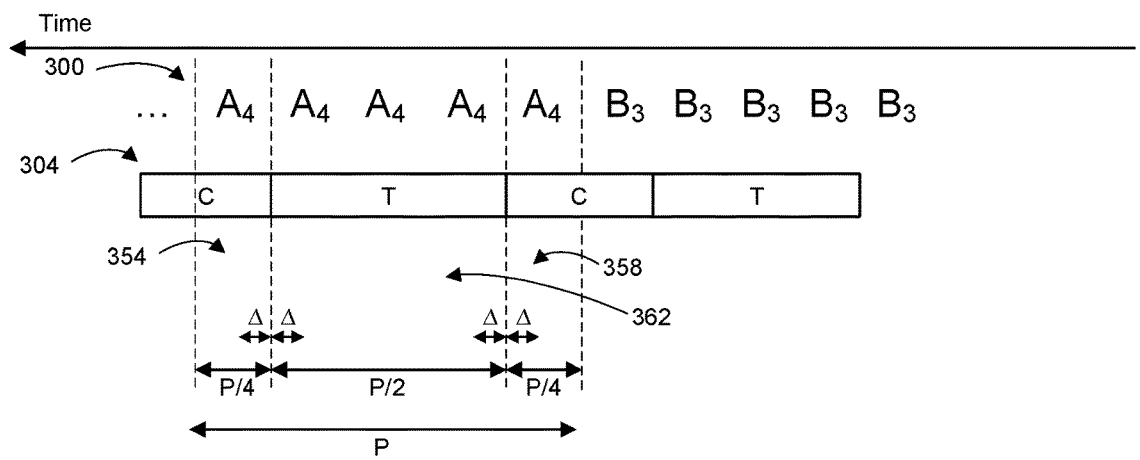
FIG. 3B is another view of a portion of the timing diagram of FIG. 3A, according to an embodiment.

FIG. 3B is another view of a portion of the timing diagram of FIG. 3A. A block period P of the schedule 304 corresponds to a length of a block of packets having the same color, as discussed above with respect to FIGS. 2A and 2B.

The block period P is partitioned into multiple segments. For example, in an embodiment, the block period P includes a first edge segment 354, a second edge segment 358, and a middle segment 362. In an embodiment, the first edge segment 354 has a duration corresponding to P/4, the second edge segment 358 has a duration corresponding to P/4, and the middle segment 362 has a duration corresponding to P/2. The edge segment 254 and the edge segment 258 generally correspond to time periods when the time-multiplexed field 184 is set to the color bit C, whereas the middle segment 262 generally corresponds to a time period in which the time-multiplexed field 184 is set to the timestamp bit T.

The schedule 304 includes a guard band ±Δ at the transition from the edge segment 354 to the middle segment 312, and at the transition from the middle segment 362 to the edge segment 258. During the guard bands, the color of packets is not permitted to change, according to an embodiment. Also during the guard bands, a packet is not permitted to be marked as requiring the receiver 108 to record the receipt time, according to an embodiment. In an embodiment, Δ is set to δ+(D−d). In an embodiment, P/4>Δ.

Referring now to FIGS. 1 and 3B, the time-multiplexed field interpreter 196 is configured to, during edge segment 354 and during the edge segment 358 (except for during the guard bands), interpret the time-multiplexed field 184 as being set to the color bit C, according to an embodiment. Additionally, the time-multiplexed field interpreter 196 is configured to, during middle segment 362 (except for during the guard bands), interpret the time-multiplexed field 184 as being set to the timestamp bit T, according to an embodiment. Further, the time-multiplexed field interpreter 196 is configured to, during the guard bands, ignore the value of time-multiplexed field 184, according to an embodiment. The time-multiplexed field interpreter 196 is configured to, during the guard bands, assume that the color of the packets has not changed, according to an embodiment.

Because the color of packets is not permitted to change during the guard bands and because a packet is not permitted to be marked as requiring the receiver 108 to record the receipt time during the guard bands, if the time-multiplexed field interpreter 196 observes a change in the value of the field 184 during the guard band, the time-multiplexed field interpreter 196 will not interpret the change as a color change; and if the time-multiplexed field interpreter 196 observes a value of the field 184 during the guard band that indicates a time of receipt should be recorded, the time-multiplexed field interpreter 196 will not flag the packet as needing a receipt time recordation, according to an embodiment.

Figure 4:
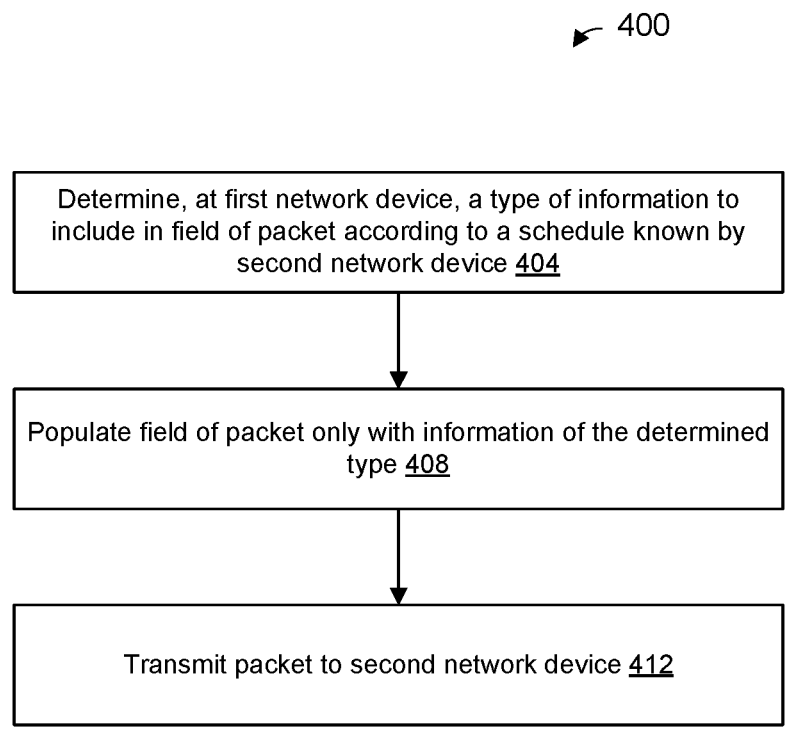
FIG. 4 is a flow diagram of an example method for generating and transmitting a packet that has a time-multiplexed field for use in measuring network performance, according to an embodiment.

FIG. 4 is a flow diagram of an example method 400 for generating and transmitting a packet for use in measuring network performance, according to an embodiment. In some embodiments, the sender 104 of FIG. 1 is configured to implement the method 400, and the method 400 is described in the context of the system 100 of FIG. 1 for explanatory purposes. The method 400, however, is implemented by another suitable device and/or used in another suitable context, in other embodiments.

Similarly, the method 400 is described in the context of the time-multiplexing techniques of FIGS. 2A, 2B, 3A, and 3B merely for explanatory purposes. The method 400 uses other suitable time-multiplexing techniques in other embodiments.

At block 404, a first network device (e.g., the sender 104) determines a type of information to be included in a field of the packet according to a schedule known by the second network device (e.g., the receiver 108). The information to be included in the field of the packet includes information related to network performance measurement, according to an embodiment. The type of information is determined from a set of different types of information, according to an embodiment. The set of different types of information includes one or both of i) a first type corresponding to loss measurement, and ii) a second type corresponding to delay measurement, in an embodiment. The set of different types of information includes other suitable types of information related to network performance measurement, in other embodiments.

In an embodiment, the schedule, according to which the type of information to be included in the packet is determined, is the same as, or similar to, the schedule described in connection with FIGS. 2A and 2B. For example, the schedule may correspond to i) setting a bit to a color bit (which indicates a color of the packet) during some time periods, and ii) setting the bit to an XOR of the color bit with a timestamp bit during other time periods, where the timestamp bit indicates whether the second network device should record a receipt time of the packet, according to an embodiment.

In another embodiment, the schedule, according to which the type of information to be included in the packet is determined, is the same as, or similar to, the schedule described in connection with FIGS. 3A and 3B. For example, the schedule may correspond to i) setting a bit to the color bit (which indicates a color of the packet) during some time periods, and ii) setting the bit to the timestamp bit (which indicates whether the second network device should record a receipt time of the packet) during other time periods, according to an embodiment.

In other embodiments, the schedule is another suitable schedule different than the schedules discussed above in connection with FIGS. 2A, 2B, 3A, and 3B.

At block 408, the first network device populates a field of a packet with information of the determined type. The field consists of a single bit, according to an embodiment. The field comprises multiple bits, according to another embodiment.

The field is included in a header of the packet, according to an embodiment. The field is included in another suitable portion of the packet (e.g., in a payload of the packet, in a midamble of the packet, in a postamble of the packet, etc.), according to another embodiment.

At block 412, the first network device transmits the packet to the second network device. In an embodiment, transmission of the packet facilitates measurement of network performance. For example, when the type of information determined at block 404 corresponds to loss measurement and indicates a color of the packet, the first network device records a number of packets in a group of consecutive packets having the same color, according to an embodiment. The recorded number of packets in a group of consecutive packets having the same color is then used to measure packet loss as discussed above, according to an embodiment. For instance, the first network device transmits the recorded number of packets (e.g., in the group of consecutive packets having the same color) to a third network device or system, such as the network management system 144, which uses the recorded number of packets to calculate a packet loss metric as discussed above, according to an embodiment.

As another example, when the type of information determined at block 404 corresponds to delay measurement and indicates that the second network device should record a receipt time of the packet, the first network device records a transmit time of the packet, according to an embodiment. The recorded transmit time of the packet is then used to measure packet delay as discussed above, according to an embodiment. For instance, the first network device transmits the recorded transmit time of the packet to a third network device or system, such as the network management system 144, which uses the recorded transmit time of the packet to calculate a packet delay metric as discussed above, according to an embodiment.

In an embodiment, a performance monitoring unit, such as the performance monitoring unit 132, of the first network device is configured to implement at least blocks 404 and 408. In an embodiment, the time-multiplexed field populator 192 is configured to implement at least blocks 404 and 408.

Figure 5:
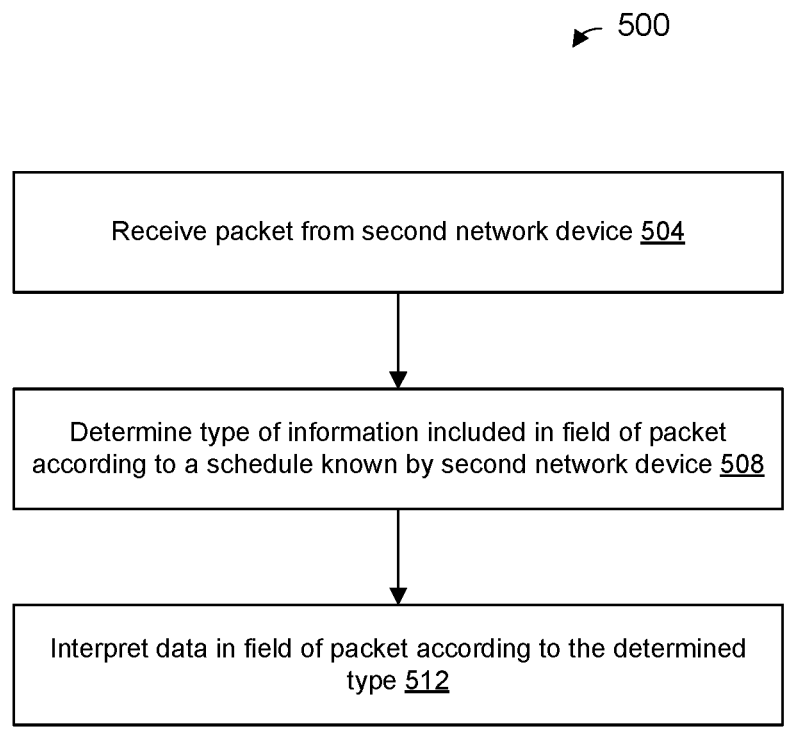
FIG. 5 is a flow diagram of an example method for processing information in a time-multiplexed field of a packet, where information in the time-multiplexed field is associated with measuring network performance, according to an embodiment.

FIG. 5 is a flow diagram of an example method 500 for processing information in a packet that is associated with measuring network performance, according to an embodiment. In some embodiments, the receiver 108 of FIG. 1 is configured to implement the method 500, and the method 500 is described in the context of the system 100 of FIG. 1 for explanatory purposes. The method 500, however, is implemented by another suitable device and/or used in another suitable context, in other embodiments.

Similarly, the method 500 is described in the context of the time-multiplexing techniques of FIGS. 2A, 2B, 3A, and 3B merely for explanatory purposes. The method 500 uses other suitable time-multiplexing techniques in other embodiments.

At block 504, a first network device (e.g., the receiver 108) receives a packet from a second network device (e.g., the sender 104).

At block 508, the first network device determines a type of information that is included in the field of the packet according to a schedule used by the second network device to populate the field in a plurality of packets, which includes the packet received at block 504. The information included in the field of the packet includes information related to network performance measurement, according to an embodiment. The type of information is determined from a set of different types of information, according to an embodiment. The set of different types of information includes one or both of i) a first type corresponding to loss measurement, and ii) a second type corresponding to delay measurement, in an embodiment. The set of different types of information includes other suitable types of information related to network performance measurement, in other embodiments.

In an embodiment, the schedule, according to which the first network device determines the type of information to be included in the packet, is the same as, or similar to, the schedule described in connection with FIGS. 2A and 2B. For example, the schedule may correspond to i) setting a bit to a color bit (which indicates a color of the packet) during some time periods, and ii) setting the bit to an XOR of the color bit with a timestamp bit during other time periods, where the timestamp bit indicates whether the second network device should record a receipt time of the packet, according to an embodiment.

In another embodiment, the schedule, according to which the first network device determines the type of information to be included in the packet, is the same as, or similar to, the schedule described in connection with FIGS. 3A and 3B. For example, the schedule may correspond to i) setting a bit to the color bit (which indicates a color of the packet) during some time periods, and ii) setting the bit to the timestamp bit (which indicates whether the second network device should record a receipt time of the packet) during other time periods, according to an embodiment.

In other embodiments, the schedule is another suitable schedule different than the schedules discussed above in connection with FIGS. 2A, 2B, 3A, and 3B.

The field is included in a header of the packet, according to an embodiment. The field is included in another suitable portion of the packet (e.g., in a payload of the packet, in a midamble of the packet, in a postamble of the packet, etc.), according to another embodiment.

At block 512, the first network device interprets data in the field according to the type of information determined at block 508. For example, when the first network devices determines (at block 508) that the type of information corresponds to loss measurement and that the data in the field indicates a color of the packet, the first network device records a number of packets in a group of packets, received from the second network device, having the same color, according to an embodiment. The recorded number of received packets in the group of packets having the same color is then used to measure packet loss as discussed above, according to an embodiment. For instance, the first network device transmits the recorded number of received packets (e.g., in the group of packets having the same color) to a third network device or system, such as the network management system 144, which uses the recorded number of received packets to calculate a packet loss metric as discussed above, according to an embodiment.

As another example, when the first network device determines (at block 508) that the type of information corresponds to delay measurement and that the data in the field indicates that the first network device should record a receipt time of the packet, the first network device records the receipt time of the packet, according to an embodiment. The recorded receipt time of the packet is then used to measure packet delay as discussed above, according to an embodiment. For instance, the first network device transmits the recorded receipt time of the packet to a third network device or system, such as the network management system 144, which uses the recorded receipt time of the packet to calculate a packet delay metric as discussed above, according to an embodiment.

In an embodiment, a performance monitoring unit, such as the performance monitoring unit 160, of the first network device is configured to implement at least blocks 508 and 512. In an embodiment, the time-multiplexed field interpreter 196 is configured to implement at least blocks 508 and 512.

Figure 6:
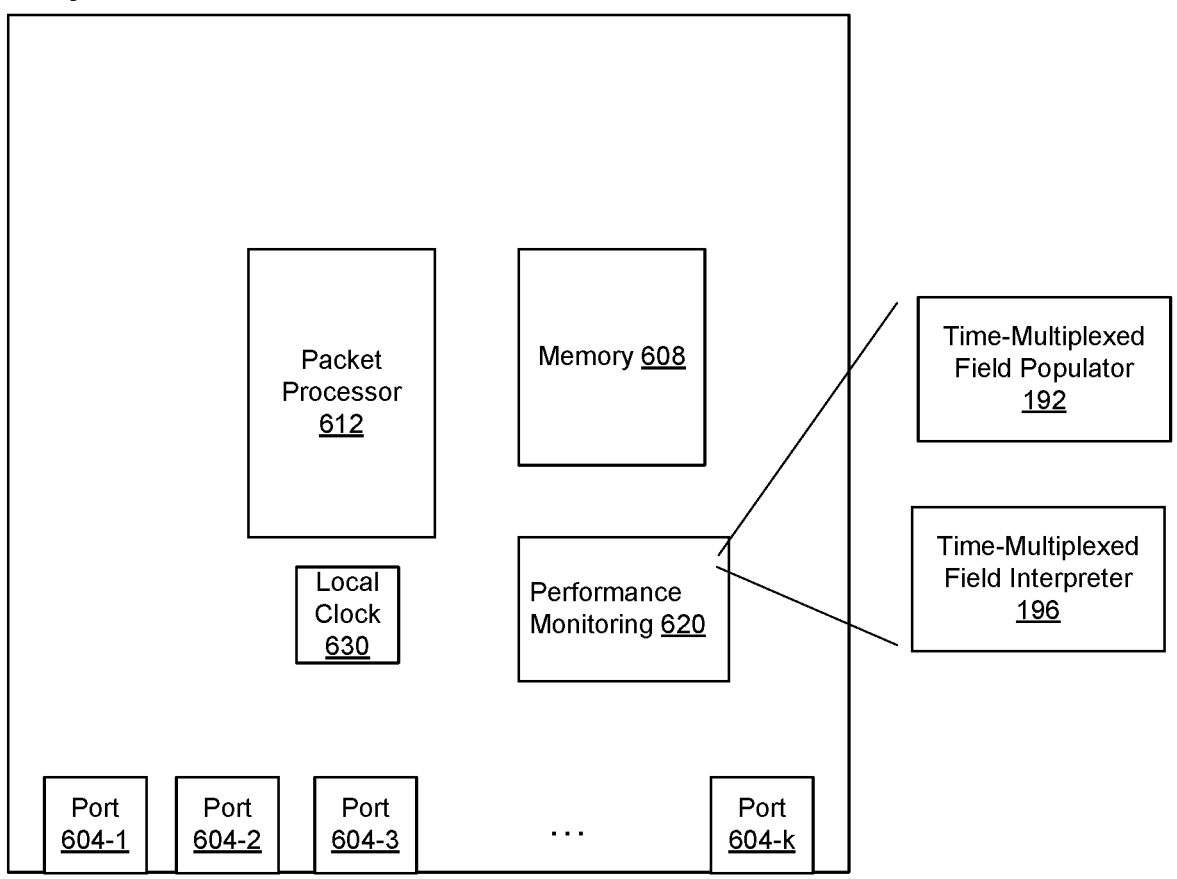
FIG. 6 is a block diagram of an example network device that uses time-multiplexed fields in packets, according to an embodiment.

As discussed above with respect to FIG. 1, the sender 104 and/or the receiver 108 are, or are components of, network infrastructure devices such as bridges, routers, etc., in some embodiments. FIG. 6 is a diagram of an example bridge or router 600 that is utilized as the sender 104 and/or the receiver 108 of FIG. 1, according to some embodiments.

The bridge/router 600 includes k ports 604, where k is a suitable positive integer greater than one. The ports 604 are configured to communicatively couple with respective network links (not shown). The bridge/router 600 also includes a memory 608 for storing packets received via the plurality of ports 604. A packet processor 612 is configured to process received packets, or portions thereof (e.g., header information), to determine via which ports 604 the packets should be transmitted. As an illustrative example, when a packet is received via port 604-1, the packet is stored in the memory 608, and the packet processor 612 analyzes header information (and optionally other information) to determine via which one or more ports 604 (e.g., egress ports) the packet should be transmitted. Then, the bridge/router 600 reads the packet from the memory 612 and transmits the packet via the one or more egress ports determined by the packet processor 612.

The bridge/router 600 also includes a performance monitoring unit 620, similar to the performance monitoring unit 132 and/or the performance monitoring unit 160 described above with respect to FIG. 1. In an embodiment, the performance monitoring unit 620 includes one or both of the time-multiplexed field populator 192 and the time-multiplexed field interpreter 196. For example, the performance monitoring unit 620 is configured to add a time-multiplexed field to packets received via the ports 104 (when the packets do not already include the time-multiplexed field); the time-multiplexed field populator 192 populates the time-multiplexed fields according to a schedule as discussed above, and then the bridge/router 600 transmits the packets via the ports 604, according to an embodiment. As another example, the time-multiplexed field interpreter 196 analyzes time-multiplexed fields included in packets (received via the ports 604), according to an embodiment.

In some embodiments, the packet processor 612 includes the performance monitoring unit 620. In some embodiments, the performance monitoring unit 620 includes a packet processor component that includes the time-multiplexed field populator 192 and/or the time-multiplexed field interpreter 196. The packet processor component of the performance monitoring unit 620 is configured to add the time-multiplexed field to at least some packets that do not already include the time-multiplexed field, in some embodiments.

The bridge/router 600 also includes a local clock 630. In an embodiment, the bridge/router 600 is configured to periodically and/or aperiodically synchronize the local clock 630 with a system clock maintained by another network device on the network 112. The time-multiplexed field populator 192 and/or the time-multiplexed field interpreter 196 are coupled to the local clock 630, and are configured to utilize the local clock 630, and the schedule, to populate and/or interpret the time-multiplexed fields.

In some embodiments, at least some ports 604 include respective timestamp units that generate receipt times for packets received via the ports, and that generates transmit times for packets transmitted via the ports 604.

In an embodiment, the performance monitoring unit 620 is implemented using a processor (not shown) that executes machine readable instructions stored in a memory (not shown). In another embodiment, the performance monitoring unit 620 is implemented using hardware circuitry such as a hardware state machine (not shown). In another embodiment, the performance monitoring unit 620 is implemented using a processor that executes machine readable instructions stored in a memory and hardware circuitry such as a hardware state machine.

Figure 7:
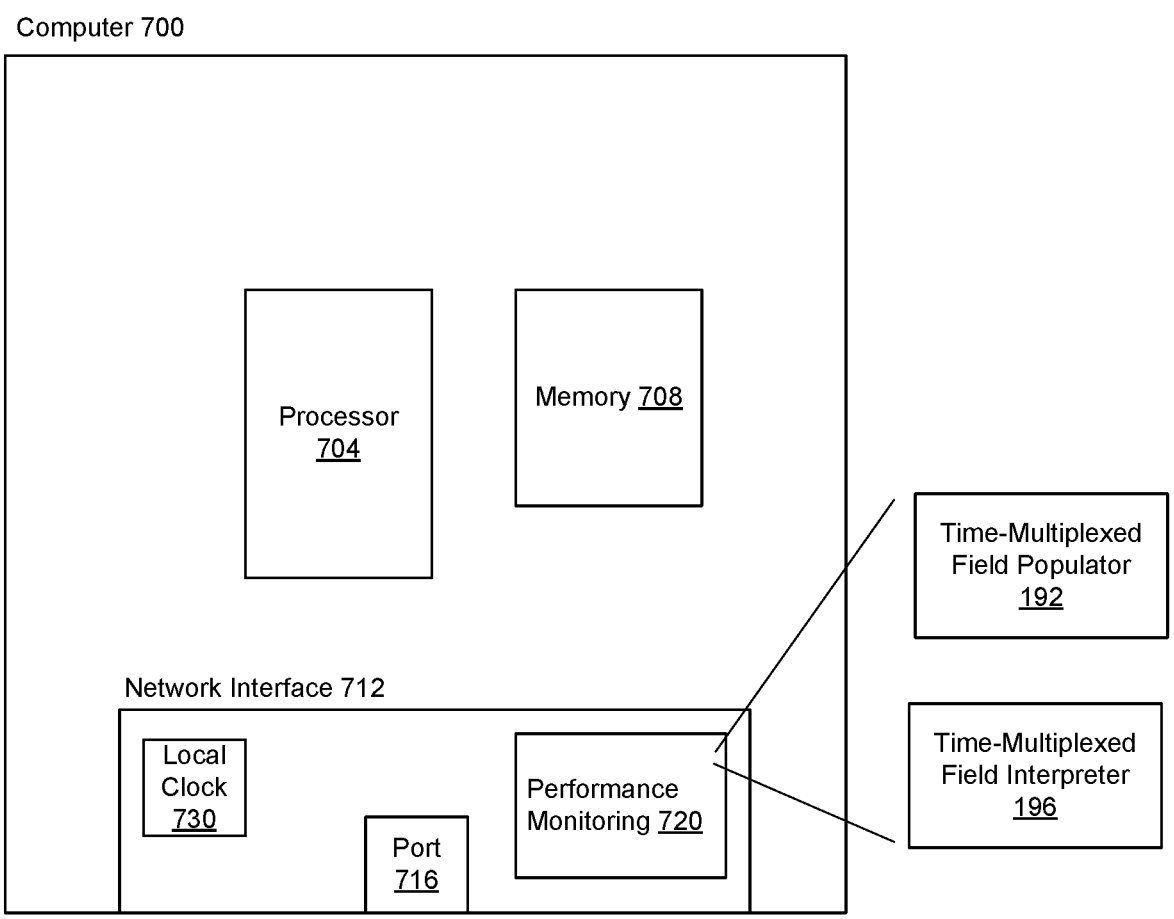
FIG. 7 is a block diagram of another example network device that uses time-multiplexed fields in packets, according to another embodiment.

FIG. 7 is a diagram of an example computer 700 that is utilized as the sender 104 and/or the receiver 108 of FIG. 1, according to some embodiments.

The computer 700 includes a processor 704 coupled to a memory 708. In an embodiment, the processor 704 is configured to execute machine readable instructions stored in the memory 708. The computer 700 also includes a network interface 712. The processor 704, the memory 708, and the network interface 712 are communicatively coupled together via one or more busses (not shown), in an embodiment.

The network interface 712 is configured to interface the processor 704 (and optionally other components of the computer 700, including components not shown in FIG. 7) to one or more network links (not shown). For example, the network interface 712 includes one or more ports 716 communicatively coupled to one or more network links.

The network interface 712 also includes a performance monitoring unit 720, similar to the performance monitoring unit 132 and/or the performance monitoring unit 160 described above with respect to FIG. 1. In an embodiment, the performance monitoring unit 720 includes one or both of the time-multiplexed field populator 192 and the time-multiplexed field interpreter 196. For example, the performance monitoring unit 620 is configured to add a time-multiplexed field to packets generated by the network interface 712 (when the packets do not already include the time-multiplexed field); the time-multiplexed field populator 192 populates the time-multiplexed fields according to a schedule as discussed above, and then the network interface 712 transmits the packets via the port 716, according to an embodiment. As another example, the time-multiplexed field interpreter 196 analyzes time-multiplexed fields included in packets received via the port 716, according to an embodiment.

In some embodiments, the network interface 712 includes a packet processor (not shown) that is configured to generate packets (e.g., media access control layer (MAC) packets and/or physical layer (PHY) packets) and provide the packets to the one or more ports 716, and/or process MAC and/or PHY packets received via the one or more ports 716. In some embodiments, the packet processor of the network interface 712 includes the performance monitoring unit 720. In some embodiments, the performance monitoring unit 720 includes a packet processor component that includes the time-multiplexed field populator 192 and/or the time-multiplexed field interpreter 196. The packet processor component of the performance monitoring unit 720 is configured to add the time-multiplexed field to at least some packets that do not already include the time-multiplexed field, in some embodiments.

The network interface 712 also includes (or in coupled to) a local clock 730. In an embodiment, the network interface 712 is configured to periodically and/or aperiodically synchronize the local clock 730 with a system clock maintained by another network device on the network 112. The time-multiplexed field populator 192 and/or the time-multiplexed field interpreter 196 are coupled to the local clock 730, and are configured to utilize the local clock 730, and the schedule, to populate and/or interpret the time-multiplexed fields.

In some embodiments, the network interface 712 includes a timestamp unit that generates receipt times for packets received via the one or more ports 716, and that generates transmit times for packets transmitted via the one or more ports 716.

In an embodiment, the performance monitoring unit 720 is implemented using a processor (not shown) that executes machine readable instructions stored in a memory (not shown). In another embodiment, the performance monitoring unit 720 is implemented using hardware circuitry such as a hardware state machine (not shown). In another embodiment, the performance monitoring unit 720 is implemented using a processor that executes machine readable instructions stored in a memory and hardware circuitry such as a state machine.

In an embodiment, a first network device comprises: one or more network ports configured to couple to one or more network links; and a packet processor coupled to the one or more network ports, the packet processor configured to forward a plurality of packets to the one or more network ports for transmission to a second network device, wherein ones of the packets include a field for indicating different, independent types of information. The first network device also comprises a field populator configured to, for each of at least some packets among the plurality of packets: determine, from a set of different, independent types of information, a type of information to be included in the field of the packet according to a schedule known by the second network device, and populate the field in the packet only with data according to the type of information determined according to the schedule.

In other embodiments, the first network device also comprises one of, or any suitable combination of two or more of the following features.

The field populator is configured to determine the type of information to be included in the field of the packet from a set of different, independent types of information related to network performance measurement.

The schedule requires that i) a value of a first type of information, among the set of different, independent types of information, and ii) a value of a second type of information, among the set of different, independent types of information, is the same during a guard band corresponding to a transition from the field including the first type of information to the field including the second type of information.

The set of different, independent types of information includes i) a first type of information corresponding to measurement of packet loss between the first network device and the second network device, and ii) a second type corresponding to measurement of packet delay between the first network device and the second network device; and the field populator is configured to, for each of at least some of the packets: populate the field in the packet with information to facilitate loss measurement when the field populator determines, according to the schedule, that the type of information to be included in the field of the packet is the first type, and populate the field in the packet with information to facilitate delay measurement when the field populator determines, according to the schedule, that the type of information to be included in the field of the packet is the second type.

The field populator is configured to, for each of at least some of the packets: populate the field in the packet with information that indicates to the second network device that the packet belongs to a group of packets when the field populator determines, according to the schedule, that the type of information to be included in the field of the packet is the first type, and populate the field in the packet with information that indicates to the second network device whether the second network device should generate a timestamp corresponding to reception of the packet when the field populator determines, according to the schedule, that the type of information to be included in the field of the packet is the second type.

The first network device further comprises a performance monitoring unit configured to: determine a count of packets in the group of packets; and send the count of packets in the group to a network management system via the one or more network ports. The first network device also comprises a timestamp unit configured to generate timestamps corresponding to transmit times of packets transmitted via the one or more network ports. The performance monitoring unit is further configured to, when the field populator determines that the type of information to be included in the field of the packet is the second type: record a transmit time of the packet, and send the recorded transmit time to the network management system via the one or more network ports.

The performance monitoring unit is a component of the packet processor.

The field populator is a component of the packet processor.

In another embodiment, a method includes: determining, at a first network device, a type of information to include in a field of a packet according to a schedule known by the second network device, the type of information determined from a set of different, independent types of information; populating, at the first network device, the field in the packet only with data according to the type of information determined according to the schedule; and transmitting, with the first network device, the packet to the second network device.

In other embodiments, the method also comprises one of, or any suitable combination of two or more of the following features.

The schedule requires that i) a value of a first type of information, among the set of different, independent types of information, and ii) a value of a second type of information, among the set of different, independent types of information, is the same during a guard band corresponding to a transition from the field including the first type of information to the field including the second type of information.

The set of different, independent types of information includes i) a first type of information corresponding to measurement of packet loss between the first network device and the second network device, and ii) a second type corresponding to measurement of packet delay between the first network device and the second network device; and populating the field in the packet includes: populating the field in the packet with information to facilitate loss measurement when the field populator determines, according to the schedule, that the type of information to be included in the field of the packet is the first type, and populating the field in the packet with information to facilitate delay measurement when the field populator determines, according to the schedule, that the type of information to be included in the field of the packet is the second type.

Populating the field in the packet with information to facilitate loss measurement includes populating the field in the packet with information that indicates to the second network device that the packet belongs to a group of packets; and populating the field in the packet with information to facilitate delay measurement includes populating the field in the packet with information that indicates to the second network device whether the second network device should generate a timestamp corresponding to reception of the packet.

The set of different types of information includes i) a first type of information corresponding to measurement of packet loss between the first network device and the second network device, and ii) a second type corresponding to measurement of packet delay between the first network device and the second network device; and the method further comprises: transmitting, with the first network device, packet count information to a third network device to enable the third network device to calculate a packet loss metric, and transmitting, with the first network device, packet transmit time information to the third network device to enable the third network device to calculate a packet delay metric.

In yet another embodiment, a first network device comprises: one or more network ports configured to couple to one or more network links; and a packet processor coupled to the one or more network ports, the packet processor configured to process a plurality of packets received from a second network device via the one or more network ports, wherein at least some packets received from the second network device includes a field for indicating different types of information. The first network device also comprises a field interpreter configured to, for each of at least some packets among the plurality of packets: determine, from a set of different, independent types of information, a type of information that is included in the field of the packet according to a schedule used by the second network device to populate fields in the plurality of packets, and interpret data in the field in the packet according to the type of information determined according to the schedule used by the second network device to populate fields in the plurality of packets.

In other embodiments, the first network device also comprises one of, or any suitable combination of two or more of the following features.

The set of different, independent types of information includes i) a first type of information corresponding to measurement of packet loss between the second network device and the first network device, and ii) a second type corresponding to measurement of packet delay between the second network device and the first network device; and the field interpreter is configured to, for each of at least some packets: interpret the data in the field as information to facilitate loss measurement when the field interpreter determines, according to the schedule, that the type of information in the field is the first type, and interpret the data in the field as information to facilitate delay measurement when the field interpreter determines, according to the schedule, that the type of information in the field is the second type.

The field interpreter is configured to, for each of at least some packets: when the field interpreter determines, according to the schedule, that the type of information in the field is the first type, interpret the data in the field as information that indicates that the packet belongs to a group of packets for which a packet loss measurement is to be performed; and when the field interpreter determines, according to the schedule, that the type of information in the field is the second type, interpret the data in the field as information that indicates whether a timestamp should be generated for the packet.

The first network device further comprises a performance monitoring unit configured to: determine a count of packets in the group of packets, and send the count of packets in the group to a network management system via the one or more network ports. The first network device also comprises a timestamp unit configured to generate timestamps corresponding to transmit times of packets transmitted via the one or more network ports; wherein the performance monitoring unit is further configured to, when the field interpreter determines that the type of information in the field is the second type: generate a timestamp corresponding to reception of the packet, and send the timestamp to the network management system via the one or more network ports.

The performance monitoring unit is a component of the packet processor.

The field interpreter is a component of the packet processor.

In still another embodiment, a method comprises: receiving, at a first network device, a packet from a second network device; determining, at the first network device and from a set of different, independent types of information, a type of information included in a field of the packet according to a schedule a schedule used by the second network device to populate fields in a plurality of packets transmitted by the second network device to the first network device; and interpreting, at the first communication device, data in the field in the packet according to the type of information determined according to the schedule used by the second network device to populate fields in the plurality of packets.

In other embodiments, the method also comprises one of, or any suitable combination of two or more of the following features.

The set of different, independent types of information includes i) a first type of information corresponding to measurement of packet loss between the first network device and the second network device, and ii) a second type corresponding to measurement of packet delay between the first network device and the second network device; and interpreting the field in the packet includes: interpreting the data in the field as information to facilitate loss measurement when the first network device determines, according to the schedule, that the type of information in the field is the first type, and interpreting the data in the field as information to facilitate delay measurement when the first network device determines, according to the schedule, that the type of information in the field is the second type.

Interpreting the data in the field as information to facilitate loss measurement includes interpreting the data in the field as information that indicates that the packet belongs to a group of packets for which a packet loss measurement is to be performed; and interpreting the data in the field in the packet with information to facilitate delay measurement includes interpreting the data in the field as information that indicates whether a timestamp should be generated for the packet.

The set of different types of information includes i) a first type of information corresponding to measurement of packet loss between the first network device and the second network device, and ii) a second type corresponding to measurement of packet delay between the first network device and the second network device; and the method further comprises: transmitting, with the first network device, packet count information to a third network device to enable the third network device to calculate a packet loss metric, and transmitting, with the first network device, packet receipt time information to the third network device to enable the third network device to calculate a packet delay metric.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first network device, comprising:
one or more network ports configured to couple to one or more network links;
a packet processor coupled to the one or more network ports, the packet processor configured to forward a plurality of packets to the one or more network ports for transmission to a second network device, wherein ones of the packets include a same single field for indicating different and independent types of information at different times; and
a field populator configured to, for at least some packets among the plurality of packets:
determine, from a set of different and independent types of information, respective types of information to be included in the same single field of the at least some packets according to a time schedule known by the second network device, and populate the same single field in the at least some packets only with respective data according to the respective types of information determined according to the time schedule, so that the types of information included in the same single field in the at least some packets transmitted to the second network device is time-multiplexed according to the time schedule.

2. The first network device of claim 1, wherein the field populator is configured to determine the respective types of information to be included in the same single field of the at least some packets from a set of different and independent types of information related to network performance measurement.

3. The first network device of claim 1, wherein the time schedule requires that i) a value of a first type of information, among the set of different and independent types of information, and ii) a value of a second type of information, among the set of different and independent types of information, is the same during a guard band corresponding to a transition from the same single field including the first type of information to the same single field including the second type of information.

4. The first network device of claim 1, wherein:

the set of different and independent types of information includes i) a first type of information corresponding to measurement of packet loss between the first network device and the second network device, and ii) a second type corresponding to measurement of packet delay between the first network device and the second network device; and the field populator is configured to, for each of at least some of the packets:

populate the same single field in the packet with information to facilitate loss measurement when the field populator determines, according to the time schedule, that the type of information to be included in the same single field of the packet is the first type, and populate the same single field in the packet with information to facilitate delay measurement when the field populator determines, according to the time schedule, that the type of information to be included in the same single field of the packet is the second type.

5. The first network device of claim 4, wherein the field populator is configured to, for each of at least some of the packets:

populate the same single field in the packet with information that indicates to the second network device that the packet belongs to a group of packets when the field populator determines, according to the time schedule, that the type of information to be included in the same single field of the packet is the first type, and populate the same single field in the packet with information that indicates to the second network device whether the second network device should generate a timestamp corresponding to reception of the packet when the field populator determines, according to the time schedule, that the type of information to be included in the same single field of the packet is the second type.

6. The first network device of claim 5, further comprising:

a performance monitoring unit configured to:

determine a count of packets in the group of packets, and send the count of packets in the group to a network management system via the one or more network ports; and a timestamp unit configured to generate timestamps corresponding to transmit times of packets transmitted via the one or more network ports;

wherein the performance monitoring unit is further configured to, when the field populator determines that the type of information to be included in the same single field of one of the packets is the second type:

record a transmit time of the one packet, and send the recorded transmit time to the network management system via the one or more network ports.

7. The first network device of claim 6, wherein the performance monitoring unit is a component of the packet processor.

8. The first network device of claim 1, wherein the field populator is a component of the packet processor.

9. A method, comprising:

determining, at a first network device, respective types of information to include in a same single field of a plurality of packets according to a time schedule known by a second network device, the types of information determined from a set of different and independent types of information;

populating, at the first network device, the same single field in the plurality of packets only with data according to the type of information determined according to the time schedule, so that the type of information included in the same single field in the plurality of packets is time-multiplexed according to the time schedule and so that the same single field in the plurality of packets includes different and independent types of information at different times; and transmitting, with the first network device, the packet to the second network device.

10. The method of claim 9, wherein the time schedule requires that i) a value of a first type of information, among the set of different and independent types of information, and ii) a value of a second type of information, among the set of different and independent types of information, is the same during a guard band corresponding to a transition from the same single field including the first type of information to the same single field including the second type of information.

11. The method of claim 9, wherein:

the set of different and independent types of information includes i) a first type of information corresponding to measurement of packet loss between the first network device and the second network device, and ii) a second type corresponding to measurement of packet delay between the first network device and the second network device; and populating the same single field in the plurality of packets includes:

populating the same single field in first packets among the plurality of packets with information to facilitate loss measurement when the field populator determines, according to the time schedule, that the type of information to be included in the same single field of the first packets is the first type, and populating the same single field in second packets among the plurality of packets with information to facilitate delay measurement when the field populator determines, according to the time schedule, that the type of information to be included in the same single field of the second packets is the second type.

12. The method of claim 11, wherein:
populating the same single field in the first packets with information to facilitate loss measurement includes populating the same single field in the first packets with information that indicates to the second network device that the first packets belong to a group of packets; and
populating the same single field in the second packets with information to facilitate delay measurement includes populating the same single field in the second packets with information that indicates to the second network device whether the second network device should generate respective timestamps corresponding to reception of the second packets.

13. The method of claim 9, wherein:
the set of different types of information includes i) a first type of information corresponding to measurement of packet loss between the first network device and the second network device, and ii) a second type corresponding to measurement of packet delay between the first network device and the second network device; and
the method further comprises:
transmitting, with the first network device, packet count information to a third network device to enable the third network device to calculate a packet loss metric, and
transmitting, with the first network device, packet transmit time information to the third network device to enable the third network device to calculate a packet delay metric.

14. A first network device, comprising:
one or more network ports configured to couple to one or more network links; and
a packet processor coupled to the one or more network ports, the packet processor configured to process a plurality of packets received from a second network device via the one or more network ports, wherein at least some packets received from the second network device includes a same single field for indicating different types of information at different times, and wherein the second network device uses a time schedule to populate the same single field in the at least some packets so that respective types of information, selected from a set of different and independent types of information, included in the same single field in the at least some packets is time-multiplexed according to a time schedule; and
a field interpreter configured to, for each of at least some packets among the plurality of packets:
determine, from the set of different and independent types of information, a type of information that is included in the same single field of the packet according to the time schedule used by the second network device to populate the same single field in the plurality of packets, and
interpret data in the same single field in the packet according to the type of information determined according to the time schedule used by the second network device to populate the same single field in the plurality of packets.

15. The first network device of claim 14, wherein:
the set of different and independent types of information includes i) a first type of information corresponding to measurement of packet loss between the second network device and the first network device, and ii) a second type corresponding to measurement of packet delay between the second network device and the first network device; and
the field interpreter is configured to, for each of at least some packets:
interpret the data in the same single field as information to facilitate loss measurement when the field interpreter determines, according to the time schedule, that the type of information in the same single field is the first type, and
interpret the data in the same single field as information to facilitate delay measurement when the field interpreter determines, according to the time schedule, that the type of information in the same single field is the second type.

16. The first network device of claim 15, wherein the field interpreter is configured to, for each of at least some packets:
when the field interpreter determines, according to the time schedule, that the type of information in the same single field is the first type, interpret the data in the same single field as information that indicates that the packet belongs to a group of packets for which a packet loss measurement is to be performed; and
when the field interpreter determines, according to the time schedule, that the type of information in the same single field is the second type, interpret the data in the same single field as information that indicates whether a timestamp should be generated for the packet.

17. The first network device of claim 16, further comprising:
a performance monitoring unit configured to:
determine a count of packets in the group of packets, and
send the count of packets in the group to a network management system via the one or more network ports; and
a timestamp unit configured to generate timestamps corresponding to transmit times of packets transmitted via the one or more network ports;
wherein the performance monitoring unit is further configured to, when the field interpreter determines that the type of information in the same single field is the second type:
generate a timestamp corresponding to reception of the packet, and
send the timestamp to the network management system via the one or more network ports.

18. The first network device of claim 17, wherein the performance monitoring unit is a component of the packet processor.

19. The first network device of claim 14, wherein the field interpreter is a component of the packet processor.

20. A method, comprising:
receiving, at a first network device, a plurality of packets from a second network device;
determining, at the first network device and from a set of different and independent types of information, respective types of information included in a same single field of the plurality of packets according to a time schedule used by the second network device to populate the same single field in the plurality of packets transmitted by the second network device to the first network device; and
interpreting, at the first communication device, respective data in the same single field in the plurality of packets according to the respective types of information determined according to the time schedule used by the second network device to populate the same single field in the plurality of packets so that the interpretation by the first communication device of the type of information included in the same single field in the plurality of packets is time-multiplexed according to the time schedule, and so that the first communication device interprets the same single field in the plurality of packets to include different and independent types of information at different times.

21. The method of claim 20, wherein:
the set of different and independent types of information includes i) a first type of information corresponding to measurement of packet loss between the first network device and the second network device, and ii) a second type corresponding to measurement of packet delay between the first network device and the second network device; and
interpreting the respective data in the same single field in the plurality of packets includes:
  interpreting the respective data in the same single field as information to facilitate loss measurement when the first network device determines, according to the time schedule, that the type of information in the field is the first type, and
  interpreting the data in the field as information to facilitate delay measurement when the first network device determines, according to the time schedule, that the type of information in the field is the second type.

22. The method of claim 21, wherein:
interpreting the respective data in the same single field as information to facilitate loss measurement includes interpreting the respective data in the same single field as information that indicates that respective first packets belong to a group of packets for which a packet loss measurement is to be performed; and
interpreting the respective data in the same single field as information to facilitate delay measurement includes interpreting the respective data in the same single field as information that indicates whether a respective timestamps should be generated for respective second packets.

23. The method of claim 20, wherein:
the set of different types of information includes i) a first type of information corresponding to measurement of packet loss between the first network device and the second network device, and ii) a second type corresponding to measurement of packet delay between the first network device and the second network device; and
the method further comprises:
  transmitting, with the first network device, packet count information to a third network device to enable the third network device to calculate a packet loss metric, and
  transmitting, with the first network device, packet receipt time information to the third network device to enable the third network device to calculate a packet delay metric.

\* \* \* \* \*